Jan. 31, 1956 T. C. SHADDEN 2,732,637
GROUND-CLEARING ATTACHMENT FOR TRACTORS
Filed July 24, 1950 2 Sheets-Sheet 1

T. C. Shadden
INVENTOR
BY *Snow &Co.*
ATTORNEYS.

Jan. 31, 1956 T. C. SHADDEN 2,732,637
GROUND-CLEARING ATTACHMENT FOR TRACTORS
Filed July 24, 1950 2 Sheets-Sheet 2
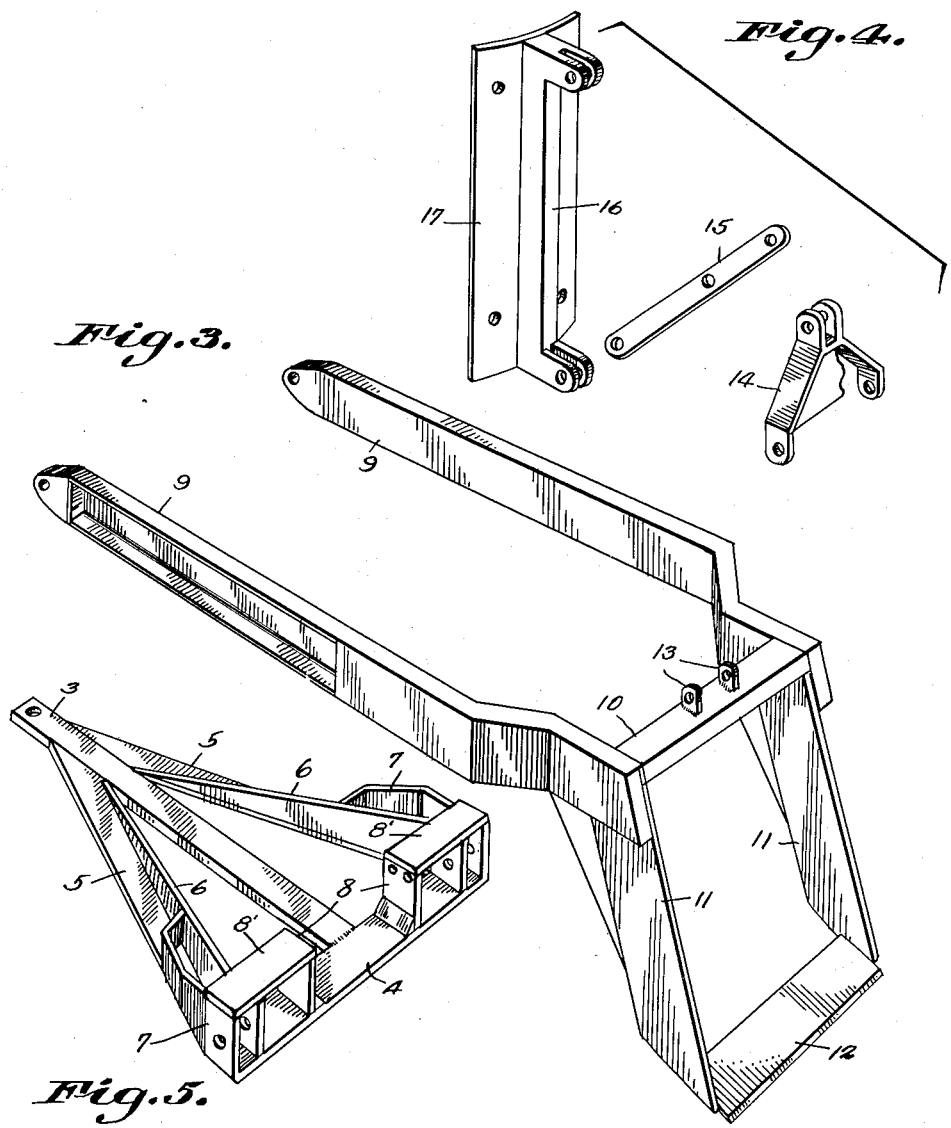
T. C. Shadden
INVENTOR
BY CA Snow &Co.
ATTORNEYS.

ns Patent Office  
2,732,637  
Patented Jan. 31, 1956

2,732,637

GROUND-CLEARING ATTACHMENT FOR TRACTORS

Tom C. Shadden, Henrietta, Tex.

Application July 24, 1950, Serial No. 175,553

1 Claim. (Cl. 37—2)

This invention relates to an attachment to a conventional tractor or bulldozer adapted to cut through the surface or root growths of underbrush and other objectionable growths.

One important object is to provide an attachment light and inexpensive in construction.

Another important object is to provide an attachment as described which will not disturb the surface to any great degree.

Another object is to permit the ready mounting or demounting of the attachment on a tractor. Still another object is to provide a ground-clearing attachment readily modified for mounting on tractors of various makes.

Another object is to provide a ground-clearing attachment adjustable as to depth of cut by connection to the conventional lifting equipment of the tractor.

Still another object is to provide ground-clearing attachment which will be strong and will comprise a minimum of parts.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Fig. 3 is a perspective view of the cutting frame.

Fig. 4 is an exploded perspective view of the lifting frame.

Fig. 5 is a perspective view of the connecting frame.

Figure 1:
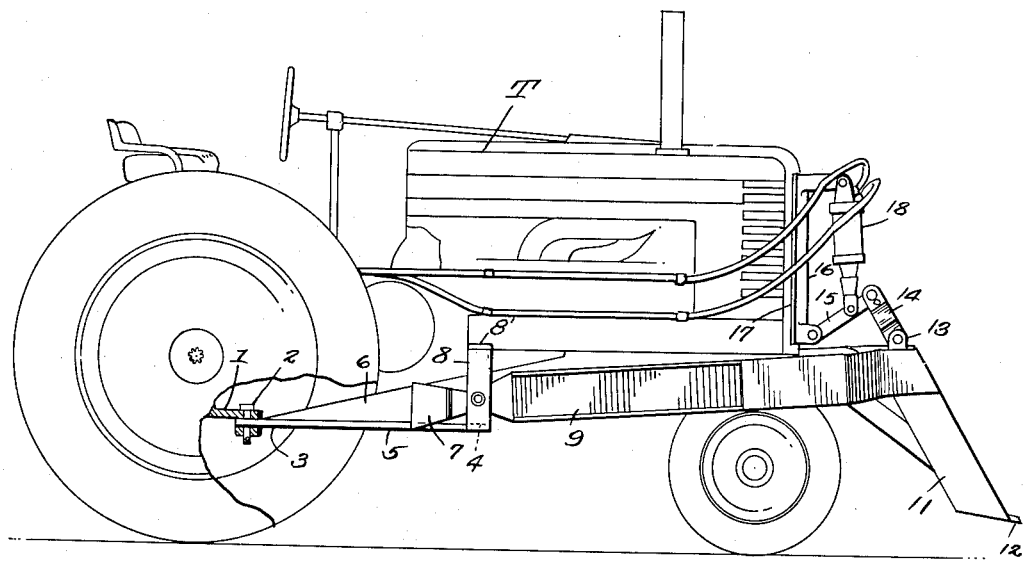
Fig. 1 is a side elevation.
Figure 2:
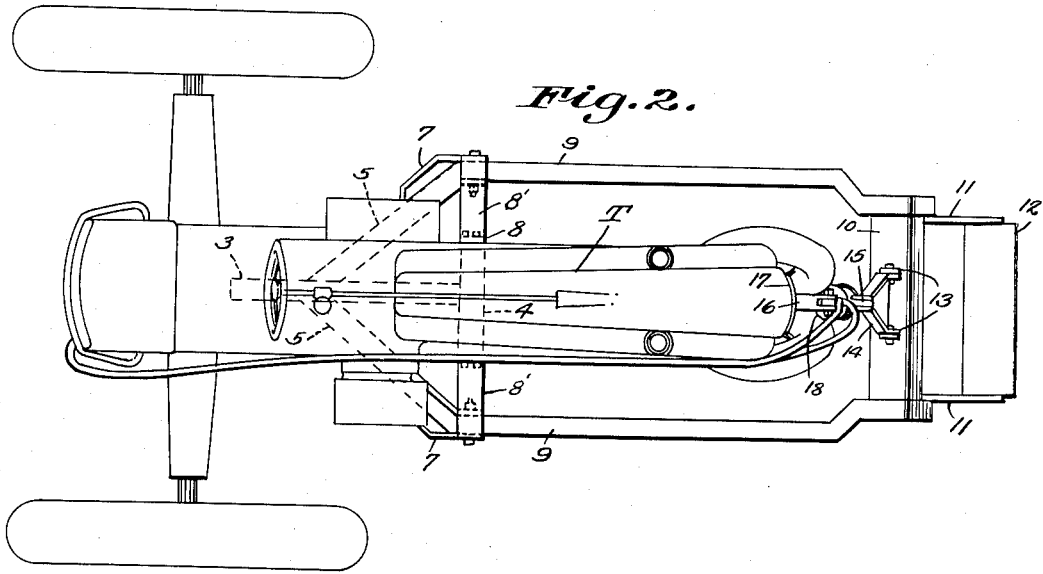
Fig. 2 is a top plan view.

Referring to the drawings in detail, the invention is illustrated as applied to one popular present day make of tractor. However, with few modifications the invention can be applied as well to other makes. The drawings are therefore intended to represent only one example of many.

A tractor T includes the axle frame 1 receiving the drop pin or bolt 2 for connecting to the axle frame the rear end of a tongue 3 extending longitudinally and centrally of and below the tractor and disposed horizontally. The front end of tongue 3 is rigid with the medial portion of a horizontal cross bar 4 extending transversely of and below the tractor and projecting beyond opposite sides of the tractor.

Angular struts 5 are rigid at their rear ends with the tongue 3 adjacent the rear end thereof and are in the plane of the tongue and cross bar. These struts are rigidly connected at their front ends to the cross bar 4 adjacent opposite ends thereof. Longitudinal ribs 6 are rigid with the struts 5 and strengthen the struts. The ribs 6 also provide at their front ends side portions of pivot yokes the other side portions of which are provided by the plates 7 rigid with the braces 5, ribs 6, and cross bar 4.

Thus, at opposite ends of and upstanding from the cross bar 4 are pivot yokes or brackets the opposite sides of each of which are provided with registering openings for receiving a pivot bolt.

The connecting frame defined by these parts and illustrated in Fig. 5 is rigidly secured at its front end to opposite sides of the tractor frame by providing upstanding ears 8 each having bolt receiving openings and each rigid with the middle portion of the cross bar 4. Bolts or other suitable connections are used to secure these to the tractor frame. Upper bars 8' overlie and extend between the members 7 and 8 on each side of the structure.

The cutting frame includes a pair of elongated arms 9 extending forwardly along opposite sides of the tractor T and having openings at their rear ends receiving pivotal connections for pivotal connection of the rear end of each arm 9 to and between the opposite side portions of each of the pivot yokes previously described.

The arms 9 project forwardly beyond the front end of the tractor and converge at their front ends to narrow the distance therebetween. The front ends of the arms 9 are rigidly connected by a cross member 10 and rigid with said cross member and said front ends of the arms 9 are the upper ends of depending blade-supporting arms 11. These extend downwardly and forwardly at an angle from the perpendicular, and have angularly cut away lower ends rigidly secured in any suitable manner to opposite ends of a flat horizontal cutting blade 12 having a sharpened forward edge disposed transversely of the direction of movement of the tractor. When the arms 9 are lowered the cutting blade 12 will be positioned at an incline from the horizontal, and will cut into the surface of the ground when the tractor moves forwardly. Thus, the cutting blade will slice through the root growths of underbrush just below the ground surface thus to clear the ground. The cutting blade has no back wall, the cutting frame being fully open so that the cut ground passes over the cutting blade with minimum disturbance thereto and drops back onto the ground surface.

For adjusting the blade 12 for depth of cut, spaced upstanding apertured ears 13 are rigid with the middle portion of the cross member 10. These are pivotally connected to the lower end of a yoke 14 pivotally connected at its upper end to the front end of a lifting arm 15 the rear end of which is pivotally connected to the lower end of a supporting bracket 16 rigid with an arcuate plate 17 curved conformably to the grill of the tractor T and rigidly secured to said grill.

To the upper end of the bracket 16 is pivotally connected the upper end of a hydraulic cylinder 18 having the hydraulically controlled piston or ram connected pivotally to the medial portion of the lifting arm 15.

In other makes of tractors lifting arrangements and pivotal mountings of the arms 9 might be necessary. In some cases the rear ends of arms 9 can be connected pivotally directly to the axle housings without need of a conecting frame such as shown in Fig. 5. In such other cases the tractors instead of having a hydraulic cylinder such as shown at 18, may have vertically swingable lifting arms at opposite sides and in these instances pivotally connected links would be employed between said lifting arms and the arms 9 for the purpose of providing for controlled swingable adjustment of the arms and associated cutting blade 12.

What is claimed is:

A ground clearing attachment for tractors comprising a crossbar engageable beneath the tractor frame, a pair of upstanding ears carried by said crossbar and adapted to be secured to the opposite sides of the tractor frame, an outer pair of ears fixed to said crossbar outwardly of said first pair of ears, an elongated tongue fixed to said crossbar and extending rearwardly and right angularly therefrom for fixed attachment to the rear portion of the tractor, a pair of rearwardly convergent struts fixed between said cross bar and the rear portion of said tongue, each strut being of right angular configuration in transverse section with one side horizontal and the other side vertical, said vertical side being fixed to the inner ear of said outer pair of ears, a pair of elongated arms pivotally disposed between said outer pair of ears, a pair of depending bars fixed to the forward ends of said arms, a blade fixed between the lower ends of said bars, a connecting bar fixed between the forward ends of said arms, and hydraulic lift means at the forward end of the tractor connected to said crossbar for raising or lowering said blade.

References Cited in the file of this patent

UNITED STATES PATENTS

| | | |
|---|---|---|
| 1,361,638 | Stephenson | Dec. 7, 1920 |
| 1,620,099 | Hover | Mar. 8, 1927 |
| 1,622,338 | Newhaus | Mar. 29, 1927 |
| 1,894,516 | Karstedt | Jan. 17, 1933 |
| 1,909,752 | Calkins | May 16, 1933 |
| 2,213,635 | Miller et al. | Sept. 3, 1940 |
| 2,295,458 | Edwards | Sept. 8, 1942 |
| 2,437,176 | Taylor | Mar. 2, 1948 |
| 2,559,816 | Alexander | July 10, 1951 |